United States Patent [19]
Rude

[11] Patent Number: 5,851,081
[45] Date of Patent: Dec. 22, 1998

[54] BI-STABLE SPRING LOADED PIVOTING JOINT

[75] Inventor: Edward T. Rude, Columbia, Md.

[73] Assignee: TorqMaster, Inc., Stamford, Conn.

[21] Appl. No.: 821,248

[22] Filed: Mar. 20, 1997

[51] Int. Cl.⁶ .................................................. F16C 11/04
[52] U.S. Cl. ........................... 403/91; 403/113; 403/119; 403/120
[58] Field of Search ..................................... 403/167, 168, 403/192, 203, 220, 229, 300, 384, 385, 405.1, 406.1, 122, 119, 113, 91, 120; 16/308, 285; 361/660

[56] References Cited

U.S. PATENT DOCUMENTS

| | | | |
|---|---|---|---|
| 864,747 | 8/1907 | Wilson | 16/285 |
| 3,339,225 | 9/1967 | Booth | 16/308 |
| 5,217,316 | 6/1993 | Ojima | 403/120 |
| 5,382,108 | 1/1995 | Ojima | 403/91 X |
| 5,393,160 | 2/1995 | Ojima | 403/113 X |

*Primary Examiner*—Anthony Knight
*Assistant Examiner*—John R. Cottingham
*Attorney, Agent, or Firm*—Gottlieb, Rackman & Reisman, P.C.

[57] ABSTRACT

The present invention provides a pivoting joint that has two stable positions. The pivoting joint is comprised of two housing elements that can rotate co-axially with respect to one another. A spring, generally in the shape of a modified hairpin, is contained within the two housing elements. The two ends of the spring fit into holes in one housing element, and the closed end of the spring is held, substantially irrotatably, in the other housing element. The spring urges the two housing elements to one or the other rotational extreme with respect to one another.

19 Claims, 4 Drawing Sheets

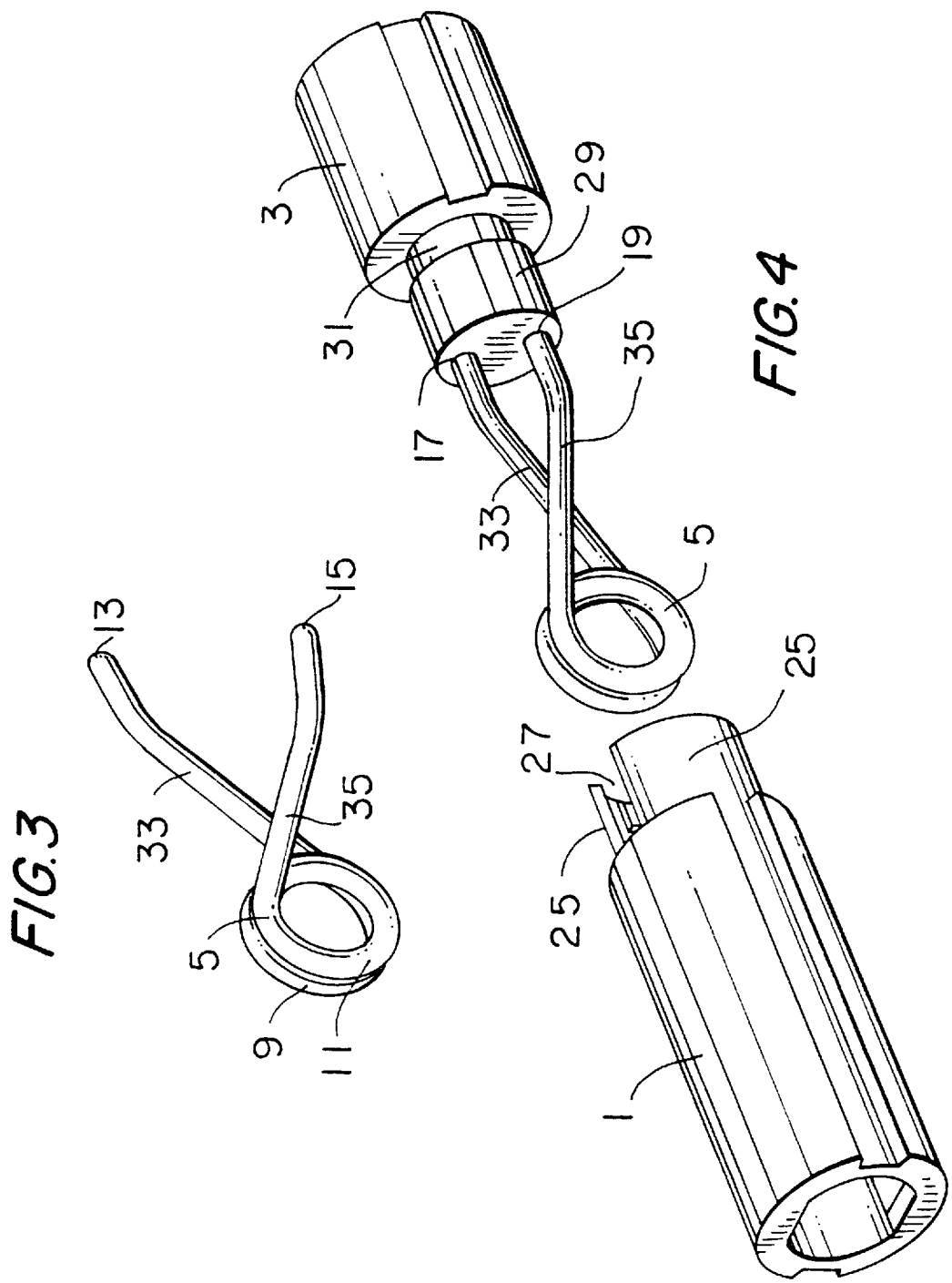

BI-STABLE SPRING LOADED PIVOTING JOINT

There are many applications for a spring loaded pivoting connection having two stable positions. Electronic devices such as cellular telephones, meters, and calculators frequently have a protective cover which is opened for use. It is often advantageous that, for both the opened and the closed positions, the cover be held rather firmly in place. Friction has been used to stabilize such covers, but frictional positioning is not as satisfactory as an over-center, spring-driven mechanism that provides a torque to urge the cover toward the open or the closed position. Certain cabinet doors, and container lids require a similar operating characteristic.

SUMMARY OF THE INVENTION

The present invention provides a pivoting joint that has two stable positions. The pivoting joint is comprised of two housing elements that can rotate coaxially with respect to one another. A spring, generally in the shape of a modified hairpin, is contained within the two housing elements. The two ends of the spring fit into holes in one housing element, and the closed end of the spring is held, substantially irrotatably, in the other housing element. The spring urges the two housing elements to one or the other rotational extreme with respect to one another.

The spring applies a pure force couple, or torque, to each of the two housing elements with respect to the other. In as much as it provides a pure couple, the spring produces no radial forces between the housing elements. Slight misalignment of the spring in the housings parts may cause small residual radial forces, but these will generally be insignificant compared to the frictional forces resulting from the weight of the element supported by the pivoting joint. The prior art contains many bi-stable spring devices. Most of them produce internal forces between elements that produces sliding friction during movement which produces undesirable effects.

BRIEF DESCRIPTION OF THE DRAWINGS

Further understanding of our invention will become apparent upon consideration of the following detailed description in conjunction with the drawings, in which:

FIG. 3 shows one configuration for the spring of the invention;

FIG. 4 is a projection view of the invention with the cover positioned for installation over the spring and around the bearing surface of the base;

DETAILED DESCRIPTION OF THE DRAWINGS

Figure 1:
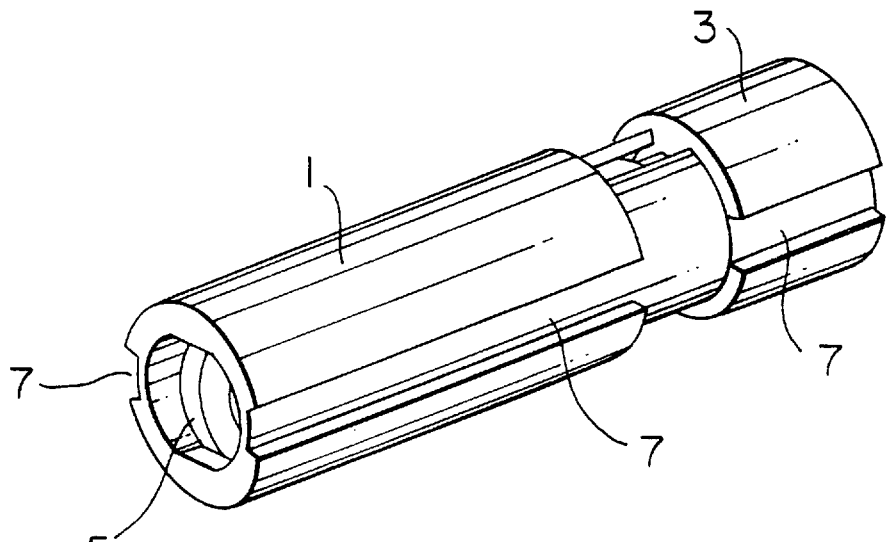
FIG. 1 is a projection view of the assembled bi-stable spring loaded pivoting joint.

FIG. 1 shows the invention assembled, consisting of housing 1, base 3, and spring 5, the closed end of which is visible through the open end of housing 1. Housing parts 1 and 3 are depicted with a generally cylindrical exterior configuration and keyways 7 to facilitate mounting in round holes having some matching feature to prevent rotation within the holes. Clearly, any other exterior shape would also lie within the scope of the invention.

Figure 2:
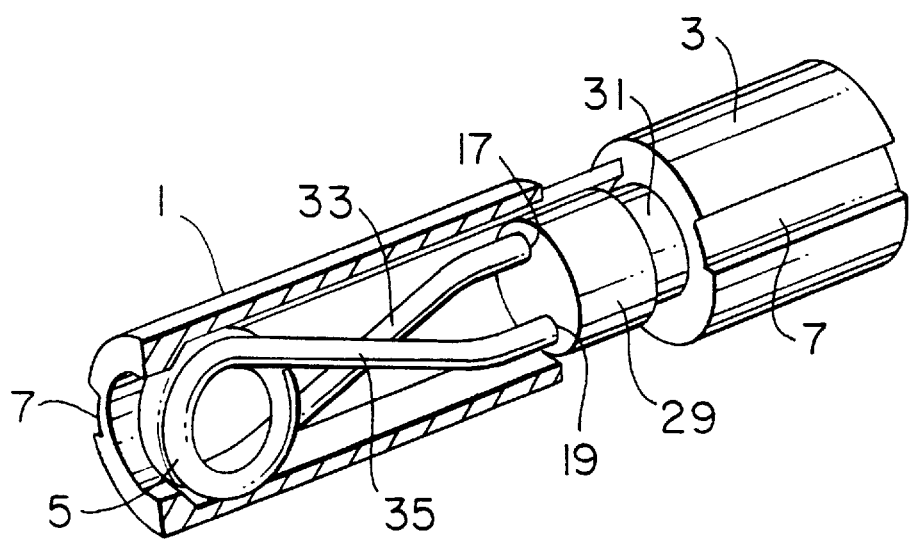
FIG. 2 is the same projection view of the device with one side of the cover cut away to reveal the spring and other interior details.

In FIG. 2, one side of housing 1 has been cut away showing spring 5 installed into base 3 and housing 1.

Referring now to FIG. 3, one embodiment of the spring of our invention is depicted in its free state. Spring 5 has been formed with two loops, 9 and 11, at the closed end to reduce bending stress during operation of the pivoting joint. The spring can be formed in other ways as is discussed later. The pivoting joint assembly begins by fitting ends 13 and 15, as best seen in FIG. 3, into pockets 17 and 19 in base 3 as seen in FIGS. 2 and 4. As seen in FIG. 3, spring ends 13 and 15 are further apart before assembly than they are when installed into base 3, as seen in FIGS. 2 and 4. Winding the spring so that the ends must be squeezed together for installation produces preload in the spring. This increases the restoring force during some portions of the operation of the pivoting joint.

Figure 5:
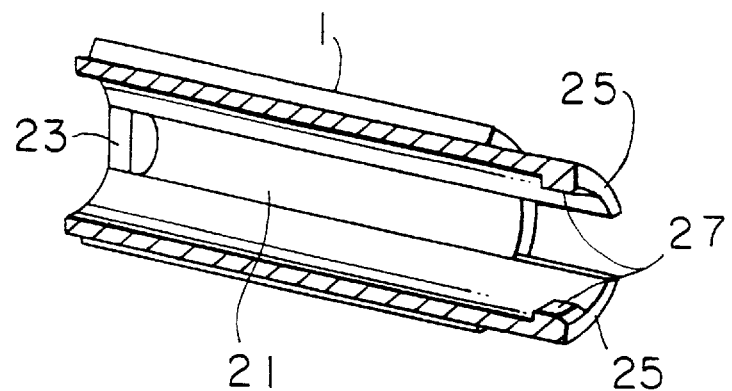
FIG. 5 is a projection view of one half of the housing which has been cut away to show the interior features of its construction.

Assembly is completed by installing housing 1 to the assembly. Housing 1 has two grooves, parallel to the axis of the housing, along opposite sides of its interior surface for receiving spring 5. FIG. 5 shows one of the grooves 21. The spring should be an easy sliding fit into grooves 21. Each of the grooves is terminated at one end by stop 23, which provides axial retention of spring 5 when housing 1 is added to the assembly. Housing 1 has two protruding ears 25 each of which has barb 27 on its interior face. Housing 1 is installed, starting from the position shown in FIG. 4, over spring 5 until it reaches the position shown in FIG. 2. Base 3 has shoulder 29 which is a sliding fit into housing 1. As housing 1 is fitted over shoulder 29, ears 25 deflect slightly, permitting barbs 27 to pass over shoulder 29 and snap into undercut 31. Barbs 27 hold housing 1 and base 3 together while permitting rotation. As seen in FIG. 2, spring 5 fits into groove 21, and loops 9 and 11 contact stop 23, holding ends 13 and 15 in pockets 17 and 19. Pockets 17 and 19 are sized so that ends 13 and 15 of spring 5 rotate freely therewithin.

Figure 6:
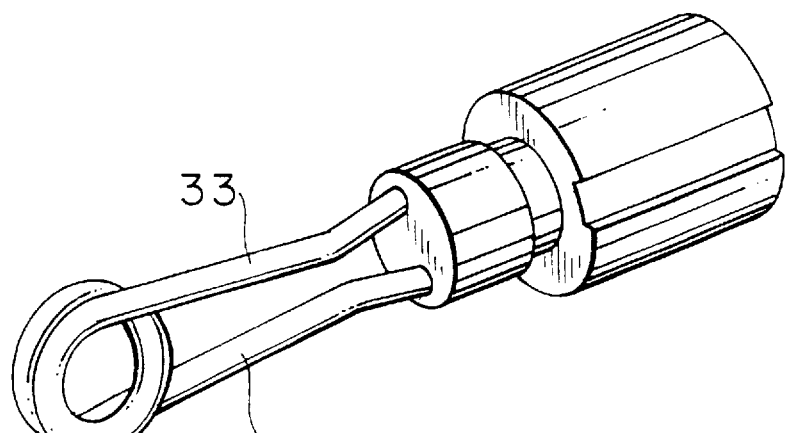
FIG. 6 is a projection view of the spring and base sub-assembly in the position of unstable equilibrium.
Figure 7:
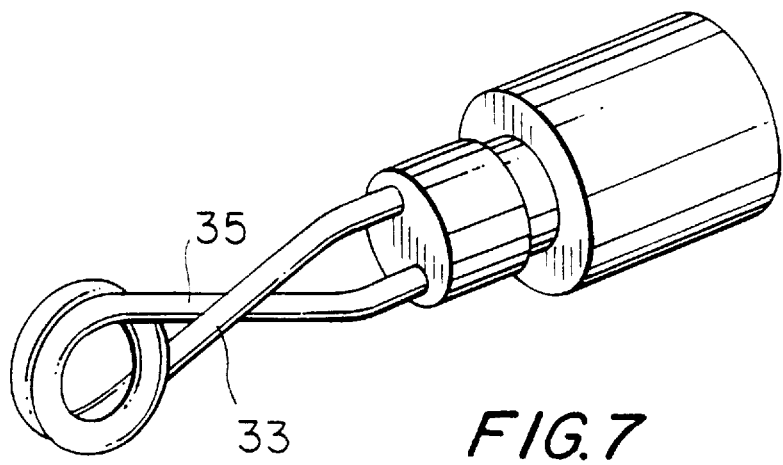
FIG. 7 is a projection view of the spring and base sub-assembly shown in one of its two stable positions.

The operation of our inventive pivoting joint can be understood by examination of FIGS. 2, 6, and 7. Beginning with the pivoting joint in the orientation shown FIG. 2, housing 1 is rotated with respect to base 3, in a direction so as to uncross legs 33 and 35 of the spring. This movement requires the application of a torque which imposes a combination of bending and torsional stresses in the wire of spring 5. After a rotation of approximately 180 degrees, the pivoting joint reaches the unstable equilibrium position shown in FIG. 6, from which housing 1 has been removed for clarity. With slight further rotation beyond the unstable equilibrium position, the force provided by spring 5 tends to move the pivoting joint toward the other stable equilibrium position, shown in FIG. 7, in which legs 33 and 35 are again crossed, but in the opposite orientation.

The amount of torque provided by the invention depends upon the wire size used for the spring, the length of legs 33 and 35, the diameter of loops 9 and 11, and the separation of pockets 17 and 19. This very simple device is capable of providing a pure torque with no net forces in directions transverse to the axis.

Figure 8:
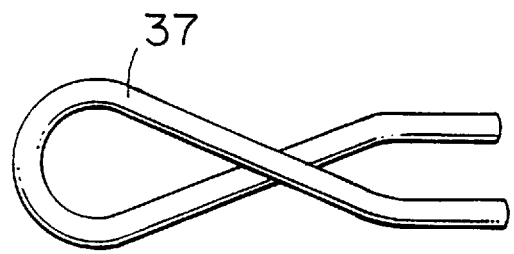
FIG. 8 shows an alternative embodiment of the spring of our invention having a one half turn loop in the spring.

FIG. 8 shows an alternative embodiment of the spring of our invention, spring 37 which has a single half-turn instead of the one-and-one-half of spring 5. For the same housing and base configuration, spring 37 requires a shorter length of wire for its formation. However, if springs 37 and 5 are designed to provide equal torques, then spring 37, because of its shorter length of spring wire, will have greater operating stresses than spring 5.

Other configurations for the spring are possible. For instance, it is possible to form the spring wire into a non-circular shape in the area of the loop to control the angular variation of torque for a particular application.

Since spring life depends on the magnitude of the operating stresses, proper spring design must be employed. The stress in the spring wire will be maximum in the position of unstable equilibrium as shown in FIG. 6. While the present invention is innovative and unique, the condition of the spring in the unstable equilibrium condition is commonly encountered in the application of torsion springs and will be familiar to, and pose no difficulty for, those skilled in the art of spring design.

Some pivoting devices that use spring detents require stops at specific angular positions. While stops can be designed into the housing and base of the present invention, a rigid stop can easily be damaged by the force of a spring detent. The spring of our invention provides an intrinsic stop by contact of the legs of the spring at each of the end positions. In the two positions of stable equilibrium, as shown in FIGS. 4 and 7, further rotation is prevented by contact between legs 33 and 35 of the spring 5. If the legs are crossed against one another by a further application of torque, legs 33 and 35 will deflect. This can be a useful attribute of the invention in that the stop positions have some resiliency. The resiliency of the stop can be controlled by varying the length of the housing and the legs of the spring.

Figure 9:
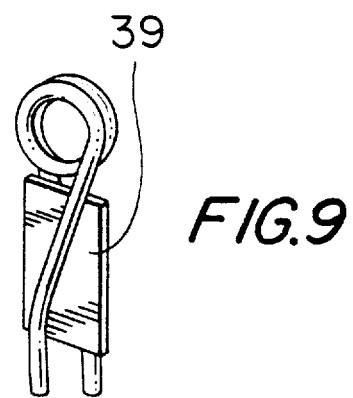
FIG. 9 shows a spring and stop plate.

In some cases, it may be desirable to limit the excursion of the pivoting pin to an angle smaller than that of the embodiment of FIG. 2. This can be accomplished by the addition of stop plate 39, as shown in FIG. 9. The stop plate fits loosely within its housing to limit the excursion of the device. Instead of a stop plate, it is also easy to reduce the angular excursion of the pivoting pin by placing tubing over one or both of the spring legs.

It will thus be seen that the objects set forth above among those made apparent from the preceding description, are efficiently attained and, since certain changes may be made in the construction of the inventive pivoting pin without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

I claim:

1. A pivot joint assembly comprising:
   first and second housing elements co-axially rotatable with respect to one another;
   a substantially hairpin-shaped spring retained within said housing elements and having a first closed end and a second substantially opposite open end;
   wherein said closed end of said spring is held substantially irrotatably in said first housing element, and said open end of said spring is engaged to said second housing element;
   wherein said spring is designed to urge selective rotation of said housing elements between two different stable yet opposite rotational extremes.

2. The assembly of claim 1, wherein said closed end of said spring has at least a single half turn.

3. The assembly of claim 2, wherein said closed end of said spring has one and one half turns.

4. The assembly of claim 1, wherein said open end of said spring comprises a pair of free ends fixedly received by said second housing element.

5. The assembly of claim 1, wherein each of said housing elements has a generally cylindrical configuration.

6. The assembly of claim 1, wherein each of said housing elements includes an external keyway to facilitate mounting of said pivot joint assembly.

7. The assembly of claim 4, wherein said free ends of said spring are selectively received in pockets formed in said second housing element.

8. The assembly of claim 4, wherein said free ends of said spring are inwardly directed towards each other in order to be received by said second housing element so as to preload said spring.

9. The assembly of claim 1, wherein said first housing includes at least one inwardly running groove for irrotatably retaining said first closed end of said spring therein.

10. The assembly of claim 9, wherein said at least one groove terminates into a stop for facilitating retention of said first closed end of said spring therein.

11. The assembly of claim 1, wherein said second housing includes a shoulder for selectively engaging with said first housing.

12. The assembly of claim 11, wherein said first housing has at least one depending ear to facilitate engagement of said first housing with said second housing.

13. The assembly of claim 12, wherein said shoulder defines an undercut for selective engagement with said at least one ear of said first housing.

14. The assembly of claim 7, wherein each of said pockets of said second housing is sized so that said free ends of said spring are rotatable therewithin.

15. The assembly of claim 1, further including means for reducing angular excursion of said spring in response to rotation of said first housing element with respect to the second housing element.

16. The assembly of claim 15, wherein said reducing means comprises a stop plate.

17. A pivot joint assembly comprising:
   first and second housing elements co-axially rotatable with respect to one another;
   a substantially hairpin-shaped spring having a first closed end defined by at least a single half turn, and a pair of legs extending into opposite free ends;
   wherein said closed end of said spring is held substantially irrotatably by at least one internal groove and wherein said free ends of said spring are engaged to said second housing element;
   wherein said spring is designed to urge selective rotation of said housing elements between two different stable yet opposite rotational extremes in which said legs of said spring are crossed when said housing elements have been urged to either of said opposite stable positions.

18. The assembly of claim 17, further including means for reducing angular excursion of said spring in response to rotation of said first housing element with respect to the second housing element.

19. A pivoting joint assembly with two stable positions comprising two housing elements which can selectively rotate co-axially with respect to one another and spring means retained within the housing elements for urging selective rotation of each of said elements in order to define two different stable and opposite rotational extremes thereof.

* * * * *